United States Patent [19]

Norvell

[11] Patent Number: 5,454,471
[45] Date of Patent: Oct. 3, 1995

[54] INSULATIVE FOOD CONTAINER EMPLOYING BREATHABLE POLYMER LAMINATE

[75] Inventor: Jean Norvell, Newark, Del.

[73] Assignee: W. L. Gore & Associates, Inc., Newark, Del.

[21] Appl. No.: 36,306

[22] Filed: Mar. 24, 1993

[51] Int. Cl.⁶ .............................. A45C 11/70; F24H 7/00
[52] U.S. Cl. ...................... 206/545; 126/400; 206/524.2; 220/745; 426/107; 426/178
[58] Field of Search ................. 206/545, 524.2; 426/107, 118, 126–128; 126/246, 400; 220/745, 367; 383/102

[56] References Cited

U.S. PATENT DOCUMENTS

| | | | |
|---|---|---|---|
| 3,335,846 | 8/1967 | Mills | 426/118 X |
| 3,484,015 | 12/1969 | Rowan | 206/545 X |
| 3,670,916 | 6/1972 | Alpert | 206/545 X |
| 3,953,566 | 4/1976 | Gore . | |
| 4,058,214 | 11/1977 | Mancuso | 426/128 X |
| 4,182,405 | 1/1980 | Hysen et al. . | |
| 4,194,041 | 3/1980 | Gore et al. . | |
| 4,283,427 | 8/1981 | Winters et al. . | |
| 4,371,554 | 2/1983 | Becker | 426/243 X |
| 4,376,558 | 3/1983 | Bandar | 206/523 X |
| 4,404,241 | 9/1983 | Mueller et al. | 206/524.2 X |
| 4,421,235 | 12/1983 | Morrya | 206/524.2 |
| 4,578,814 | 3/1986 | Skamser . | |
| 4,640,838 | 2/1987 | Isakson et al. | 426/107 |
| 4,777,930 | 10/1988 | Hartz | 126/246 |
| 4,802,233 | 1/1989 | Skamser . | |
| 4,806,736 | 2/1989 | Schirico . | |
| 4,816,646 | 3/1989 | Solomon et al. . | |
| 4,856,650 | 8/1989 | Inoue | 206/524.2 X |
| 4,922,626 | 5/1990 | Fiddler . | |
| 4,925,732 | 5/1990 | Driskill et al. . | |
| 4,942,214 | 7/1990 | Sakhpara . | |
| 5,026,591 | 6/1991 | Henn et al. . | |
| 5,052,369 | 10/1991 | Johnson | 126/400 |
| 5,070,223 | 12/1991 | Colasante . | |
| 5,180,075 | 1/1993 | Montalbano | 426/128 X |

FOREIGN PATENT DOCUMENTS

| | | |
|---|---|---|
| 2737756 | 3/1979 | Germany . |
| 8704663 | 8/1987 | WIPO . |
| 9104152 | 4/1991 | WIPO . |

OTHER PUBLICATIONS

Thermal Bags by Ingrid, Inc. brochure 887 Church Road Elgin, Ill. 60123 (no date).
The Elevator Bag brochure, Star Industries Inc., 5711 Sheldon Road, Canton, Michigan 48188 (no date).
GMA Therm–O–Pouch "Dinner is Served" brochure, 1605 Beard Street Port Huron, Michigan 48060 (no date).
"Hotshot Deivery Systems", Delivery Concepts, Inc., 58356 County Road 3 South, Elkhart, Indiana 46517, (no date).
The Elevator Bag, Price List, Star Industries, Inc., 5711 Sheldon Road, Canton, Michigan, 48188, (no date).

*Primary Examiner*—Bryon P. Gehman
*Attorney, Agent, or Firm*—David J. Johns

[57] ABSTRACT

An improved container for transporting food and similar products is provided. The container employs one or more layers of a breathable material which is permeable to water vapor but repellent to liquid. By enclosing hot food in this container, moisture vapor from the food dissipates away from the food and avoids the soggy texture which often accompanies transported food. The container of the present invention has a wide range of possible applications, including everything from delivery of individual pizzas to large scale relocation of food for institutional purposes.

22 Claims, 3 Drawing Sheets

INSULATIVE FOOD CONTAINER EMPLOYING BREATHABLE POLYMER LAMINATE

BACKGROUND OF THE INVENTION

1. Field of the Invention

The present invention relates to apparatus for protecting and preserving food, and especially for protecting hot food during transportation.

2. Description of Related Art

In recent years the business of delivering hot food to a home or business has grown dramatically. The current market for pizza delivery alone is estimated to comprise billions of dollars in business each year. Moreover, numerous other businesses depend upon individualized delivery of hot food, including catering businesses, various Asian, Mexican and other ethnic food restaurants, services providing hot meals to elderly and other shut-ins, services providing hot meals to schools and camps, etc.

In light of the active interest in such businesses, it is hardly surprising that tremendous activity has centered around means of keeping food hot (or cold) and fresh during transportation. The most common containers in this regard have been primary food packages constructed from waxed paper, plastic or cardboard. Although such containers are inexpensive and convenient, they have proven limited in their ability to preserve the temperature, freshness and texture of the food.

In response to these concerns, a number of solutions have been proposed. For example, delivered pizza today is commonly placed in a primary food receptacle (e.g. a cardboard box) and then inserted into an insulative pouch for transportation. These pouches are generally constructed from an outer shell of durable knit-backed vinyl or similar polymer material, insulated with approximately 1¼ inches of open cell foam on either side of the pizza box, and lined with a nylon coated with vinyl, or similar material.

In order to protect the insulation from becoming wet and/or contaminated with food, the interior liner is normally made water proof to contain moisture within the liner. It is generally recognized that the free flow of liquid through the liner presents a distinct health hazard by allowing bacteria to grow within the insulation and pass back to the food in condensed water vapor. Additionally, when foam insulation becomes wet, it loses its insulative properties and may even become a heat sink. To address these concerns, recent improvements in this area have included providing a liner of polyester MYLAR-type material which is both heat reflective and almost completely water and water vapor impermeable.

Although such pouches are convenient, relatively inexpensive, and a substantial improvement over the use of a box alone, they are deficient in many respects. The primary problem with these devices is that a sealed interior liner tends to trap moisture vapor given off by the food within the container itself. As the packaging begins to cool, this trapped moisture vapor condenses and leads to the pizza becoming "soggy." The addition of grommetted vent holes in the side of the pouch offers only limited improvement in these conditions. Vent holes free moisture vapor, but they simultaneously release heat-requiring careful proportions to permit liberating some steam while retaining a sufficiently hot and moist pizza. To compound this problem further, the loss of too much moisture is also to be avoided since it can result in the food becoming dry and unappetizing. As a result, these pouches are limited in their utility and service range and present a constant threat of cool and/or damp or dry pizza.

In light of these limitations, a number of far more exotic solutions have been proposed. U.S. Pat. No. 4,806,736 issued Feb. 21, 1989, to Schirico and U.S. Pat. No. 4,816,646 issued Mar. 28, 1989, to Greve each discloses use of pizza delivery containers containing built-in electric resistance heating elements to help keep pizzas hot. To address the problem of moisture build-up specifically, U.S. Pat. No. 4,922,626 issued May 8, 1990, to Fiddler discloses a pizza delivery container with a motor-driven fan to circulate moist air over a moisture-removing dissicant cartridge. These solutions may function reasonably well for their stated purposes, but they are each considered needlessly complicated and too cumbersome and expensive for widespread use.

Another area of growing interest is the delivery of relatively large quantities of hot foods. In addition to normal catering activities, a number of businesses have sought to expand into the delivery of large number of pizzas and other foods to schools and camps. In this context, the use of a relatively small pouch is simply impractical. Moreover, employing numerous pizza boxes or other primary food receptacles is considered both wasteful and a needless expense.

One solution proposed in this regard is to provide a rack in lo which multiple reusable trays of food can be stacked. To insulate the food in the rack, a padded nylon cover is formed around the rack to help contain the food heat. With a much greater quantity of food and much less relative outside surface area, food tends to stay warmer in this environment. Unfortunately, the problem of moisture build-up may be compounded since the amount of food contained in the rack is far greater than the available surface area permitting moisture dissipation. Additionally, if covered primary food receptacles are not employed in the food racks, there is also an increased risk of both liquid precipitating onto the food and bacterial contamination.

Finally, there are believed to be other applications where a breathable, insulated container for carrying perishables is of use. For example, in the transportation of certain biomedical products and specimens it is sometimes desirable to keep the product at a constant temperature but allow the dissipation of moisture vapor without a build up of condensation.

Accordingly, it is a primary purpose of the present invention to provide an apparatus for protecting food and similar products which is effective at dissipating unwanted moisture vapor while retaining heat.

It is a further purpose of the present invention to provide such an apparatus which provides an effective barrier to liquid entering the storage area through either condensation or seepage from wet weather or other ambient conditions.

It is an additional purpose of the present invention to provide such an apparatus which can be adapted to control moisture effectively in a variety of applications, including instances where relatively large quantities of perishables must be protected.

It is another purpose of the present invention to provide such an apparatus which is relatively easy to construct, use, and transport.

These and other purposes of the present invention will become evident from review of the following specification.

SUMMARY OF THE INVENTION

The present invention is an improved container for storing and insulating transported food and similar products. The container comprises one or more layers of a polymer fabric which is permeable to moisture vapor but resistant to liquid penetration. Preferably a laminate of porous polytetrafluoroethylene is used which has proven to be highly effective at selectively transmitting water vapor while acting as a barrier to transmission of liquid water. When steaming hot food or other perishable is stored in the container of the present invention, moisture vapor freely dissipates from the food storage area so as to avoid the detrimental effect of condensation on the food.

In the preferred embodiment of the present invention, the container employs multiple layers, with a "breathable"/water repellent inner shell directly surrounding the food or food receptacle, an exterior shell protecting the outside of the container, and a layer of insulation provided between the inner and exterior shells to help retain heat within the container. As the term "breathable" is applied herein, it is meant to encompass any material permitting the passage of moisture vapor. In practice, moisture vapor will pass out of the storage area and either vent to atmosphere or condense between the inner shell and the exterior shell. Since the inner shell is waterproof, condensate is prevented from re-entering the storage area.

In a further improvement of the present invention, a temperature maintenance device, preferably comprising a phase change material, is employed to assist in maintaining the temperature of the container at a desired level over an extended period of time.

The present invention has proven to be quite successful at properly transmitting moisture vapor and delivering food which is hot and fresh. The present invention avoids many of the problems previously encountered with some previous insulated storage bags, such as soggy or dry food, and risk of bacterial contamination.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved container for storing virtually any form of food or similar material. Although the primary intended use of the present invention is for the transportation of food, and the term "food" is applied throughout this specification for the purpose of simplicity, it should be appreciated that the present invention may be used to store or transport a variety of products, and especially perishable products and specimens, such as those encountered in health care and biomedical applications.

Figure 1:
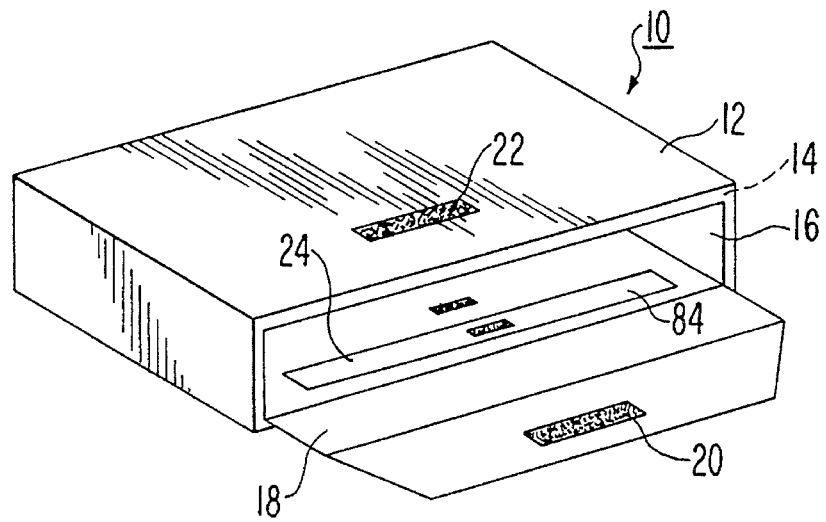
FIG. 1 is a three-quarter isometric view of a first embodiment of a container of the present invention.
Figure 2:
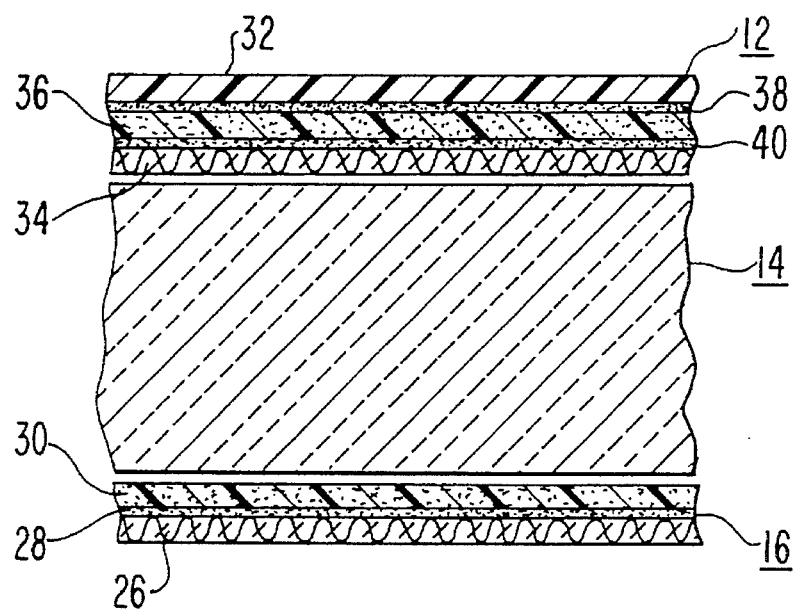
FIG. 2 is an enlarged cross-sectional view of an exterior shell, insulative layer, and interior shell of the embodiment of FIG. 1.

Shown in FIGS. 1 and 2 is one embodiment of a container 10 of the present invention. Container 10 is formed as a pouch adapted to receive one or more conventional pizza boxes or similar primary food receptacles and seal around the receptacles to assist in keeping them warm. The container 10 comprises an exterior or secondary shell 12, an insulation layer 14, and an interior shell or liner 16. In order to seal around the receptacles, a flap 18 is provided which can be held in place with any suitable means, such as zippers or hook-and-loop fasteners 20, 22, as shown. The container 10 is also provided with a sealable pocket 24 in the inner liner 16 to receive a heat emitting device as is described below.

As has been explained, in a conventional pouch of this form, a serious problem emerges of condensation from food moisture vapor building up within the pouch and precipitating on the food. This tends to leave the food "soggy" and less appetizing.

However, if the pouch is made from water permeable material, it tends to suffer from numerous other problems. First, the pouch provides insufficient protection from the elements, risking wet and cold food due to seepage of rain or snow. Second, a water permeable inner lining allows water vapor to condense within the insulation layer and lead to heat loss problems. Third, a water permeable inner lining further allows condensation from the insulation layer to pass back through to the food storage area—again making the food wet and cold. Moreover, the passage of condensate from the insulation layer to the food storage area also provides a very undesirable mechanism for bacterial growth from the inaccessible (and thus difficult to clean) insulation layer to contaminate the food. This concern is amplified if the permeable inner lining allows food particles to enter the insulation layer and culture bacterial growth therein.

In order to combat the moisture vapor problem, the present invention uses an inner liner which is moisture vapor permeable but liquid repellent. As is taught in U.S. Pat. No. 3,953,566 issued Apr. 27, 1976, to Gore, one such material can be formed by heating and rapidly expanding polytetrafluoroethylene (PTFE). Improvements in this basic process are disclosed in a variety of patents, including U.S. Pat. No. 4,194,041 issued Mar. 18, 1980, to Gore et al., and U.S. Pat. No. 5,026,591 issued Jun. 25, 1991, to Henn et al. The resulting product contains a micro-porous lattice of expanded PTFE which is porous enough to allow water vapor to pass through but is hydrophobic and sufficiently dense to repel liquid water. This "breathable"/water repellent material is commercially available from W. L. Gore & Associates, Inc., of Elkton, Md., in a variety of forms, including as a laminated fabric, available under the registered trademark GORE-TEX, which has the expanded PTFE membrane pre-applied to a polymer fabric material.

Shown in FIG. 2 is a more detailed representation of the various components of the container of the present invention. In this embodiment, the inner shell 16 comprises a layer of polymer fabric 26, such as a nylon taffeta. Attached to the fabric 26 with an adhesive layer 28 is a membrane of expanded PTFE 30. The PTFE membrane 30 comprises a sheet of expanded PTFE made in accordance with the teachings of U.S. Pat. No. 4,953,566 to Gore with a microporous lattice comprising nodes interconnected with fibrils. This lattice should provide sufficient pore size for the passage of water vapor while being sufficiently dense and hydrophobic so as to repel liquid water.

Additional water repellency and resistance to contamination of the pores can be achieved by coating the membrane with a variety of substances, such as perfluorosulphonic acid or breathable polyurethane. Processes for providing such coatings are set forth in a number of patents, including U.S. Pat. No. 4,194,041 to Gore et al., U.S. Pat. No. 5,026,591 to Henn et al., and U.S. Pat. No. 4,942,214 issued Jul. 17, 1990, to Sakhpara. Although a coating tends to decrease moisture vapor permeability, it significantly increases the durability and liquid repellency of the membrane. Moreover, as is explained below, by varying the type of membrane (e.g. the average pore size therein) and the type and amount of coating applied to the membrane, the precise amount of moisture vapor permeability can be adjusted to produce a customized container with ideal conditions for certain types of foods and for certain service ranges (i.e. periods of time and conditions under which particular food will stay fresh).

The membrane can be bonded to the fabric through any conventional means, including through the use of an adhesive. The adhesive may be of any appropriate form which will bind the membrane 30 to the fabric 26 without clogging the pores. Suitable adhesives include, but are not limited to, the class consisting of thermoplastic polymers, thermosetting polymers, or reaction curing polymers. In order to maintain moisture vapor transmission, the adhesive should either be breathable and/or applied only in a noncontinuous manner (e.g. through a dot pattern). The adhesives may be applied to the surfaces to be laminated by conventional means, for example by coating or printing methods, or under pressure and heat similar to the process disclosed in U.S. Pat. No. 4,194,041 to Gore et al. Additionally, in embodiments incorporating a coating on the expanded PTFE, as is described above, a hydrophilic polyurethane polymer or similar material can perform a dual role of serving as a protective coating and adhesively bonding the expanded PTFE membrane to the fabric layer. These and other suitable adhesives are disclosed in U.S. Pat. No. 4,925,732 issued May 15, 1990, to Driskill et al.

It should be understood that the expanded PTFE membrane, protective coating, and fabric can be arranged in any orientation which will provide the permeability and barrier protection of the present invention. For example, in place of the orientation shown in FIG. 2, the expanded PTFE membrane 30 may be oriented facing the interior of the container, with the fabric 26 facing the insulation 14. For this alternative arrangement, it would be preferred to provide an adhesive layer 28 of hydrophilic polyurethane to help improve water repellency and reduce the risk of contamination of the PTFE membrane.

Since the exterior shell 12 must withstand greater abuse, it is preferable that it is constructed from a more durable material, such as vinyl, expanded vinyl, woven nylon (e.g. CORDURA fabric available from E. I. DuPont Co. of Wilmington, Del.), etc. As shown, the exterior shell comprises an outer layer 32 of nylon fabric bonded to a coated expanded PTFE membrane 36 (similar to that disclosed in U.S. Pat. No. 4,194,041 to Gore et al.) and an inner layer 34 of nylon taffeta fabric bonded to an un-coated expanded PTFE membrane (similar to that disclosed in U.S. Pat. No. 3,953,566 to Gore). Although this construction is not necessary for the proper operation of the present invention, for some applications it is believed desirable to provide the exterior shell with a water resistant/breathable layer of expanded PTFE membrane 36. Again, the membrane 36 is held in place with a suitable adhesive 38, 40 or similar means.

The insulative layer 14 may take any appropriate form. It is common today to use an open cell foam (e.g. polyurethane) 1 to 2 inches thick. This form of insulation is inexpensive yet has good insulative properties and good impact resistance. Furthermore, when used in conjunction with the embodiment of the present invention illustrated in FIGS. 1 and 2, this form of insulation tends to breathe sufficiently to permit moisture vapor to pass completely out of the container 10. Additional or alternative insulation can be provided in the form of metallic coatings, and most open or closed cell foams and similar products, including polyesters, puffed polyesters (e.g. THERMOLITE insulation available from E.I. DuPont Co. or THINSULATE insulation available from Minnesota Mining and Manufacturing Co. of St. Paul, Minn.), styrene, polyethylene, fiberglass, urethanes, and other such products.

Due to the amount of breathability which can be imparted with the present invention, vent holes can be eliminated from the pouch to provide a more thoroughly sealed container. Nonetheless, for some applications such vent holes may be desirable (such as to provide further increased air flow or to release some of the fragrance of the food as a marketing tool) and can be easily included in the container of the present invention. As is known, it is preferred to provide a grommet or other reinforcement means around such holes.

Figure 3:
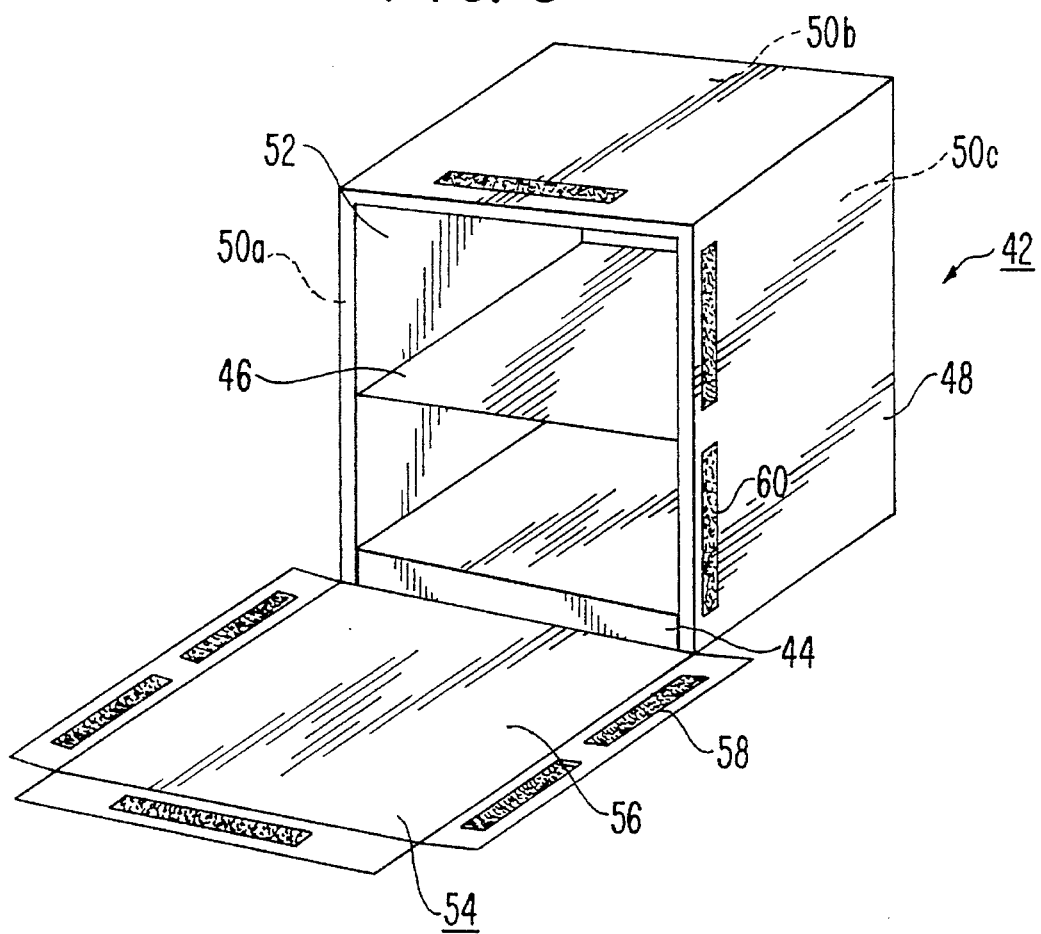
FIG. 3 is a three-quarter isometric view of a second embodiment of a container of the present invention, equipped with a rack for stacking multiple layers of food.

Another embodiment of the present invention is shown in FIG. 3. In this configuration, a container 42 is arranged in a rack format, providing means to stack a relatively large number of separate primary food receptacles 44. In the illustrated embodiment, the primary food receptacle 44 comprises a cardboard box commonly used for delivered pizzas. Such receptacles 44 work well in the context of the present invention since they are inexpensive yet adequately separate the food from the container 42 while permitting moisture vapor to pass relatively freely from them.

To assist in stacking the primary food receptacles 44, one or more shelves 46 may be included to help organize the receptacles and limit the amount of weight imposed on the lower receptacles. The shelves 46 may be constructed from any suitable material, including a fabric, or semi-rigid or rigid metal or plastic material attached within the container 42.

Like the embodiment of FIGS. 1 and 2, this container 42 also is constructed from an exterior shell 48, an insulation layer 50a, 50b, 50c in some or all of the sides of the container, and an interior shell or liner 52. Again, the interior shell comprises a breathable moisture vapor permeable material which is resistant to liquid penetration. Due to reduced outside surface area relative to the amount of food which can be stored in this container 42, it is preferred that the liner 52 be constructed from material with a fairly substantial moisture permeability, such as un-coated expanded PTFE material available from W. L. Gore & Associates, Inc., under the trademark GORE-TEX fabric. Additionally, it may be even more desirable in this instance to also construct the exterior shell 48 from similar material, as is shown in FIG. 2.

The container 42 is sealed through any suitable means, such as with flap 54. The flap 54 may be constructed from the same material as the rest of the container 42 and should include at least a breathable interior liner 56. The flap may be closed against the rest of the container using hook-and-loop fasteners 58, 60, or other appropriate means.

Figure 4:
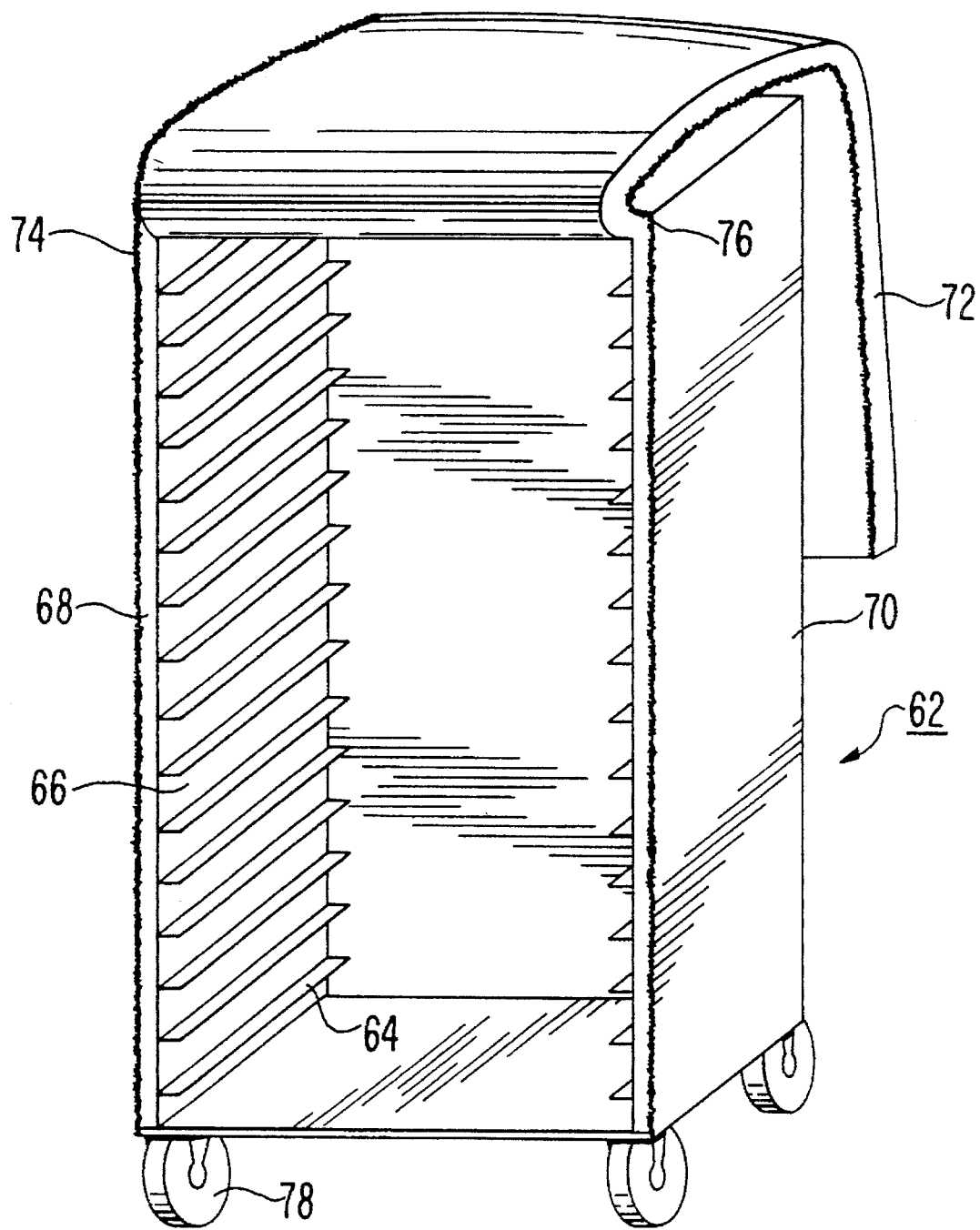
FIG. 4 is a three-quarter isometric view of third embodiment of a container of the present invention, also equipped with a rack for stacking multiple layers of food.

Shown in FIG. 4 for much larger applications is a container 62 constructed to hold very large quantities of food in a rack format. In this form, the container 62 includes multiple shelf channels 64 to receive primary food receptacles, such as cardboard boxes (as have been discussed), or disposable or reusable food trays, etc. Again, the container 62 is constructed with a breathable yet water repellent liner 66, an insulative layer 68, and an exterior shell 70. Like the embodiment of FIG. 3, the decreased relative outside surface area compared to the large food carrying capacity of this embodiment requires a liner 66, and perhaps insulation 68 and exterior shell 70, with a high degree of breathability.

A flap 72 is provided to seal the container 62. This flap 72 can be insulated and also constructed from breathable material. The flap 72 may be sealed through use of any suitable means, including hook-and-loop fasteners or zippers 74, 76, as shown.

Due to the size of the container 62 of this embodiment, it may be desirable to provide casters 78 or similar means to help in transportation.

Figure 5:
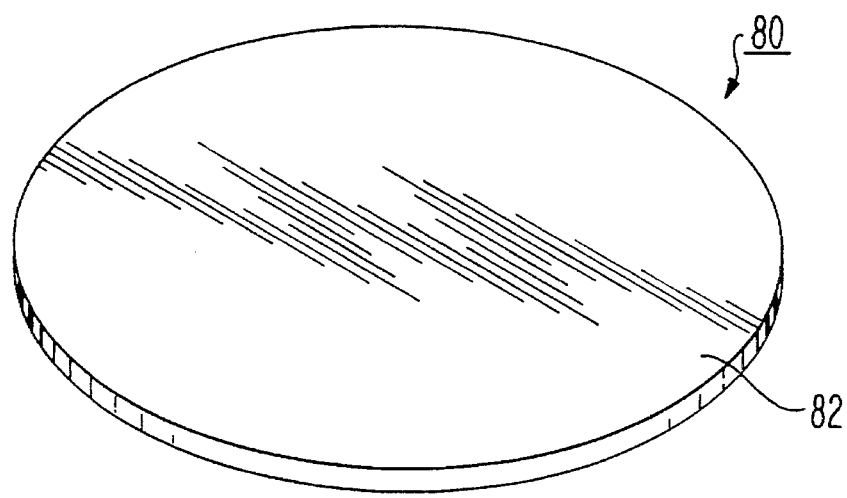
FIG. 5 is a three-quarter perspective view of a packet of heat emitting material which may be employed in the present invention, the packet being insertable into a pocket provided in the container shown in FIG. 1.

Further improvement in the present invention can be provided by including some external heat source. Shown in FIG. 5 is a temperature maintenance device in the form of a sealed packet 80 containing a phase change material 82. Phase change material comprises a composition which can be activated to cause it to give off heat over a period of time. Alternatively, the material may also be designed to absorb heat over a period of time to provide a cooling effect.

To help maintain food in a hot condition, a phase change material may be provided which can give off a steady amount of heat over an extended period of time. Examples of such material are disclosed in U.S. Pat. No. 5,070,223 issued Dec. 3, 1991, to Colasante.

Essentially, phase change material includes a solid inert material with an appropriate melting point. By dispersing the inert material within an insulative material and applying heat to melt the inert material, portions of the inert material will slowly cool in stages to return to a solid state. This phase change back to a solid state is an exothermic reaction which provides a steady source of heat.

For use in the present invention, a phase change material with an active ingredient of sodium acetate tetrahydrate or polyethylene glycol is believed suitable. Preferably, the phase change material comprises a mixture of silicone, graphite and polyethylene glycol which is blended to evenly distribute the polyglycol throughout the other ingredients. The material may be packaged within a sealed container to prevent leakage, such as silicone, polyethylene, vinyl, or polyester.

To activate the material, it is exposed to an energy source, such as placing it in a 600 watt microwave oven over a period of approximately 1 minute. When heated in this manner, the phase change material will give off a fairly constant heat of approximately 135° to 185° F. over a period of 30 to 60 minutes. One such sample tested gave off a temperature of about 185° F. for about 15 minutes after initial equilibrium was reached, then a temperature plateau of about 135° F. for another 30 to 45 minutes during phase change, and a steady decline in temperature thereafter. Accordingly, a reliable temperature production could be provided by this material over a period of up to 45 to 60 minutes or more.

As should be evident, by placing one or more packets 80 into a container of the present invention, the heat and freshness of the food can be maintained over a significantly extended period of time. The embodiment of FIG. 1 includes a pocket 24 adapted to receive such a packet 80. The pocket 24 includes a hook-and-loop sealable flap 84 to help isolate the packet from the food storage area. Depending upon the particular effectiveness of such material for a given food, it may be possible to reduce or eliminate the use of insulation and/or decrease or eliminate the amount of breathability of the container's fabric.

Although not preferred, without departing from the present invention, other heat or cooling sources may also be combined with the present invention for improved operation. Possible examples include a battery or fuel powered heating elements, etc.

Even though incorporating a layer of expanded PTFE membrane is the preferred treatment to provide the properties of the present invention, a number of other treatments may also be effective in this regard. For instance, virtually any appropriate material can be employed which will allow passage of moisture vapor while resisting passage of liquid, such as polyethylene glycol-based materials, polyether polyurethanes, polyester polyethers, polyethylene, epoxies, polyimides, polyvinyl alcohol, as well as treated natural materials such as cellulose or cotton.

It should be appreciated that the present invention may be adapted for use in many different applications. Depending upon the food material and the environmental conditions, containers may be constructed with a single layer of polymer fabric, with numerous layers of fabric and/or insulation, and with hybrid polymer shells—only a portion of which being constructed from a breathable fabric. Due to the present cost of the most effective forms of breathable/waterproof fabrics, for many applications it may be preferred to construct the liner from only a portion of breathable fabric in those areas requiring greatest breathability (e.g. the top and/or sides) and using a less expensive liquid impermeable fabric for the remainder of the shell.

Although the present invention is particularly applicable to the transportation of steaming hot food, such as pizza, as has been noted, it has numerous other possible applications for the transportation and/or short-term storage of other perishables, such as cold foods, bio-medical products or specimens, etc.

Depending upon requirements, the containers of the present invention may be employed with or without a separate primary food receptacle. Where a primary food receptacle is employed, it should be constructed from a material which is permeable to moisture vapor, such as paper, cardboard, cellulose. etc. With or without a primary food receptacle, the material described has proven to be readily cleanable and highly resistant to penetration by food particles.

Without intending to limit the scope of the present invention, the following represent examples of how the containers of the present invention may be constructed and employed:

EXAMPLES

A series of containers were constructed and tested to determine the relative effectiveness of the present invention over existing food delivery containers and variations of designs pursuant to the present invention.

Container 1

A first container in the form of a pizza pouch was constructed comprising a water impermeable vinyl exterior shell and a nylon taffeta interior liner bonded to an un-coated expanded porous PTFE GORE-TEX membrane acquired from W. L. Gore & Associates, Inc. An insulative layer of 1¼ inches of open cell polyurethane was provided on the top and bottom of the pouch between the shell and the liner. Two conventional grommetted vent holes were provided in the side of the container to permit insertion of a temperature probe.

Container 2

A second container was constructed identical in form to that of Container 1 but with an exterior shell of nylon taffeta bonded to a polyurethane coated expanded PTFE GORE-TEX membrane.

Container 3

A third container was constructed identical in form to that of Container 1 but with an exterior shell of nylon taffeta bonded to an un-coated expanded PTFE GORE-TEX membrane.

Container 4

A fourth container was constructed identical in form to that of Container 1 but with an exterior shell of nylon taffeta bonded to an un-coated expanded PTFE GORE-TEX membrane and a liner of nylon taffeta bonded to a polyurethane coated expanded PTFE GORE-TEX membrane.

Each of the above containers was tested under the following parameters. First, a strip thermometer (e.g. a THERMOLABEL) was placed on the interior bottom of the food storage areas of each of the containers. These thermometers provide a permanent reading of the highest temperature reached. Five identical pizzas packaged within a conventional corrugated cardboard boxes were then placed one in each of the containers. A second strip thermometer was placed on the top exteriors of each of the pizza boxes. After 30 minutes, a temperature probe was inserted within each of the containers and a temperature reading was taken.

The following results were achieved:

| Container | Temp. Top of Pizza | Temp. Bottom of Pizza |
| --- | --- | --- |
| 1 | 150° F. | 160° F. |
| 2 | 140 | 160 |
| 3 | 180 | 180 |
| 4 | 140 | 150 |

At this point, the interior temperature of each of the bags was tested with a temperature probe. Each was above 140° F.

Generally pizza delivery standards call for pizza to be approximately 165° F. when removed from an oven, about 155° F. when delivered to a table within a restaurant, and above 120° F. when transported and delivered after 30 minutes. Accordingly, each of these pizzas proved to be well within acceptable temperature parameters.

When the pizzas were removed, the interior of each of the containers was inspected for condensation. The interior of each of the containers proved to be free of any noticeable moisture.

By way of comparison, a commercially available pizza delivery container was simultaneously tested. This container comprised a water and water vapor impermeable vinyl exterior shell, 1¼ inches of polyurethane foam insulation, and an impermeable vinyl interior shell. Two grommetted vent holes were provided in the side of the container.

Although the commercial container delivered pizza at or slightly above the temperatures of the sample containers of the present invention, a visual inspection of the interior of the container after 30 minutes showed substantial condensation buildup. The amount of water present was so great that the pizza box had become wet from the condensate. Further, when stored after the test, the commercial container remained wet for an extended period of time—with noticeable moisture still present after two days of no use. This moisture retention problem is expected to be far worse when the bags are used repeatedly and are not concertedly dried between uses.

A subjective taste test of the five pizzas delivered within the five bags tested found them all to be comparative in temperature, taste and moisture content.

It should be evident from the above examples that containers constructed in accordance with the present invention significantly avoid moisture problems commonly encountered with presently available delivery containers.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A container for protecting perishable products during transportation which comprises a polymer shell adapted to cover and retain a product to be protected;

an outer secondary shell surrounding the polymer;

a thermally insulative layer oriented between the secondary shell and the polymer shell;

wherein each of the polymer shell and the secondary shell includes a breathable laminate, the laminate comprising a micro-porous polymer which selectively permits moisture vapor to pass through the polymer shell and prevents liquid from passing therethrough;

wherein the polymer shell and laminate and the secondary shell and laminate serve to protect the product to be protected from condensed moisture vapor by allowing moisture vapor to pass through the micro-porous polymer and away from the product to be protected.

2. The container of claim 1 wherein the breathable laminate comprises a membrane of polytetrafluoroethylene (PTFE).

3. The container of claim 2 wherein the breathable laminate comprises a membrane of expanded PTFE with a polyurethane coating applied thereto.

4. The container of claim 1 wherein the thermal insulative layer comprises a foam.

5. The container of claim 1 which further comprises:

the secondary shell and the polymer shell being formed as a pouch adapted to seal around the product to be protected.

6. The container of claim 5 wherein the pouch is adapted to receive a moisture permeable primary receptacle in which the product to be protected is stored.

7. The container of claim 1 wherein the container includes a rack adapted to receive multiple layers of product to be protected.

8. The container of claim 1 wherein the container is adapted to receive a moisture vapor permeable primary receptacle in which the product to be protected is stored.

9. The container of claim 8 which further comprises a rack for stacking multiple primary receptacles.

10. The container of claim 1 which further includes a temperature maintenance device within the container to assist in maintaining the temperature of the product to be protected.

11. The container of claim 10 wherein the temperature maintenance device comprises a packet containing phase change material, the phase change material serving to radiate heat when activated.

12. The container of claim 11 wherein a pocket is provided within the liner to house the packet.

13. An improved apparatus for preservation of hot perishable products during transportation which comprises:
- a container having an exterior shell, an interior liner, and an insulation layer therebetween, a sealable storage area being formed within the interior liner;
- a temperature maintenance device including phase change material which provides a relatively steady source of heat once activated;
- wherein the temperature maintenance device is placed within the storage area along with a product to be protected in order to assist in maintaining the temperature of the product to be protected;
- the liner having an interior and an exterior surface, the liner being constructed at least in part from a material which is permeable to moisture vapor and resistant to liquid penetration, the product to be protected being placed within the storage area during transportation;
- wherein moisture vapor emitted from the product to be protected dissipates from the interior of the liner by penetrating the breathable liner, and liquid on the exterior of the liner, including condensed moisture vapor, is prevented from entering the interior of the liner by the liquid resistant material.

14. A container for protecting perishable products during transportation which comprises
- a polymer shell adapted to cover and retain a product to be protected;
- a breathable laminate attached to at least a portion of the polymer shell, the laminate comprising a porous polymer which selectively permits moisture vapor to pass through the polymer shell and restricts liquid from passing therethrough;
- an outer secondary shell surrounding the polymer shell, the secondary shell and the polymer shell being formed as a pouch adapted to seal around the product to be protected;
- a thermally insulative layer oriented between the secondary shell and the polymer shell;
- wherein the polymer shell and laminate serve to protect the product to be protected from condensed moisture vapor by allowing moisture vapor to pass through the polymer and away from the product to be protected.

15. The container of claim 14 wherein the secondary shell includes a moisture vapor permeable material.

16. The container of claim 14 wherein the pouch is adapted to receive a moisture permeable primary receptacle in which the product to be protected is stored.

17. The container of claim 14 which further includes a temperature maintenance device within the container to assist in maintaining the temperature of the product to be protected.

18. The container of claim 17 wherein the temperature maintenance device comprises a packet containing phase change material, the phase change material serving to radiate heat when activated.

19. The container of claim 17 wherein a pocket is provided within the liner to house the temperature maintenance device.

20. The container of claim 16 which further comprises a rack for stacking multiple primary receptacles.

21. The container of claim 14 wherein the breathable laminate comprises a membrane of polytetrafluoroethylene (PTFE).

22. The container of claim 21 wherein the breathable laminate comprises a membrane of expanded PTFE with a polyurethane coating applied thereto.

* * * * *